United States Patent [19]

Mezey

[11] Patent Number: 5,163,805
[45] Date of Patent: Nov. 17, 1992

[54] WASTE COLLECTION SYSTEM FOR SEGREGATING SOLID WASTE INTO PRESELECTED COMPONENT MATERIALS

[76] Inventor: Armand G. Mezey, 2724 West Palm La., Phoenix, Ariz. 85009

[21] Appl. No.: 722,514

[22] Filed: Jun. 27, 1991

Related U.S. Application Data

[62] Division of Ser. No. 324,697, Mar. 17, 1989, Pat. No. 5,035,563.

[51] Int. Cl.⁵ .............................................. B65F 3/04
[52] U.S. Cl. .................................................. 414/786
[58] Field of Search ............................. 414/406–409, 414/512, 517, 786; 220/909, 553

[56] References Cited

U.S. PATENT DOCUMENTS

| | | | |
|---|---|---|---|
| 3,211,312 | 10/1965 | Miller | 414/406 |
| 3,643,993 | 2/1972 | Asadurian | 414/408 X |
| 3,844,344 | 10/1974 | Blakely et al. | 414/409 |
| 3,857,503 | 12/1974 | Brown | 414/406 X |
| 3,958,715 | 5/1976 | Capelli | 220/909 X |
| 4,057,156 | 11/1977 | Thompson et al. | 414/408 |
| 4,113,125 | 9/1978 | Schiller | 414/406 |
| 4,219,298 | 8/1980 | Stragier et al. | 414/409 |
| 4,310,279 | 1/1982 | Johnston | 414/406 X |
| 4,775,066 | 10/1988 | Keppeler | 220/909 X |
| 4,834,253 | 5/1989 | Crine | 220/909 X |
| 4,834,262 | 5/1989 | Reed | 220/909 X |
| 4,840,531 | 6/1989 | Dinneen | 414/409 |
| 4,905,853 | 3/1990 | Strawder | 220/909 X |
| 4,934,896 | 6/1990 | Quinto | 414/408 X |
| 5,007,786 | 4/1991 | Bingman | 414/409 |

FOREIGN PATENT DOCUMENTS

| | | | |
|---|---|---|---|
| 0184739 | 6/1986 | European Pat. Off. | 414/409 |
| 3537546 | 4/1987 | Fed. Rep. of Germany | 414/409 |
| 3636019 | 4/1988 | Fed. Rep. of Germany | . |
| 3703557 | 8/1988 | Fed. Rep. of Germany | 414/408 |

Primary Examiner—David A. Bucci
Attorney, Agent, or Firm—Gregory J. Nelson

[57] ABSTRACT

An improved waste collection system having an on-site container which is internally compartmented to receive and separately store the various waste components such as aluminum, glass, paper and land-fill trash. The route collection vehicle is divided into chambers and has a compaction system for compacting the contents of at least some of the collection vehicle chamber. The vehicle has a loading apparatus which lifts the container to an inverted dumping position in which position the container is positioned with respect to the chambers to cause the waste to be inherently separated or classified within the collection vehicle chambers. The loading apparatus may be side or front loading.

4 Claims, 7 Drawing Sheets

WASTE COLLECTION SYSTEM FOR SEGREGATING SOLID WASTE INTO PRESELECTED COMPONENT MATERIALS

This is a divisional of copending application Ser. No. 07/324,697 filed on Mar. 17, 1989, now U.S. Pat. No. 5,035,563.

FIELD OF THE INVENTION

The present invention relates to an improved waste collection system and more particularly to an improved waste collection system having a compartmented on-site refuse container and a compartmented waste collection vehicle with a loader which container and vehicle cooperate to intrinsically segregate the recyclable components and the nonrecyclable components at the time of collection.

DESCRIPTION OF THE PRIOR ART

It has been estimated that in the United States per capita solid waste generation amounts to between 3.5 and 6.5 pounds per day. The problem of disposing of this amount of refuse is a major concern. Landfills are being closed as they are becoming filled to capacity or become the source of hazardous pollution problems. Other methods of solid waste treatment such as incineration also present pollution problems and therefore are not effective to deal with solid waste disposal crisis.

One approach to the waste problem is recycling. A large portion of solid waste can be reclaimed, recycled and resold. It is estimated that composition of U.S. solid waste is basically as follows:

| Material | Percent of Total |
| --- | --- |
| Paper/Board | 29%–37% |
| Food Waste | 8%–17% |
| Yard Waste | 13%–20% |
| Glass | 9%–10% |
| Metals | 9%–10% |
| Plastics | 2%–7% |
| Wood | 3%–4% |
| Textiles | 2%–4% |
| Other | 1%–3% |

From the foregoing, it appears that at least 50% of waste materials are recyclable and can be removed to significantly reduce the amount of solid waste that is disposed of in landfills. A Univeristy of Arizona study indicated that 63% of household garbage is recyclable. The recyclables may be re-used for economic advantage providing income to the waste collection agency. It is noted that the terms "refuse" and "waste" are used interchangeably to connote discarded materials of the type itemized above which are generated by man.

In view of this, various state and local governments have instituted mandatory recycling programs. One major problem with such recycling programs is to provide user-acceptable systems which will effectively and efficiently remove the reclycables.

To this end, the prior art has generally relied on collection systems having vehicles with compartmented bodies which are manually loaded. These vehicles may be side-loading or end-loading vehicles which may operate in connection with some type of lift. The various waste components are stored in separate containers for pick-up at regular intervals. Some areas now require the consumer to manually separate the waste. In the case of a domestic collection system, the homeowner is required to place aluminum in one container, glass in another and yard waste and garbage in another. In some such systems, the on-site collection containers are compartmentalized. German Patent No. DE3636019 shows a compartmented container for residential use. The waste collection vehicle is driven to a location adjacent the containers. The collection crew members must then manually dump the containers or empty the container compartment into the appropriate compartment of the collection vehicle. In some cases, the collection vehicles are low-profile for easier manual dumping. Vehicles of this type are represented by the ECO 300 Recycler manufactured by Loda, Inc. and the Eager Beaver Low Profile Recycler manufactured by General Engines Co., Inc. A similar rear-loading arrangement is represented by the trailer manufactured and sold by Summit Trailer Sales, Inc.

Various side-loading designs are also available in the prior art having compartments for receiving manually separated trash which compartments may be raised by means of an appropriate power lift, as for example a hydraulic or chain-driven lift to dump the waste into a selected compartment of the trailer. Typical of these are the recycling truck and body manufactured by Labrie. A particularly effective automated side-loading recycling collection system is sold under the name Flexi-Dump which system is the subject of co-pending application Ser. No. 07/281,558, in the name of John W. Bingman, now U.S. Pat. No. 5,007,786.

The Flexi-Dump system includes an improved loader for refuse collection vehicles. The loader has a carriage assembly on vertical tracks on the side of the collection vehicle. The carriage assembly is movable between a vertical upper dump position and a vertical down or home position. In the home position, the carriage assembly is positioned at the side of the collection vehicle and may be laterally or horizontally extended a predetermined distance to retainably receive or engage a refuse container. Once engaged, the refuse container is retracted to the home position and is then moved upwardly along the tracks or the carriage assembly until the contents of the refuse container are emptied or dumped into one of the compartments of the vehicle trailer. The empty carriage assembly then returns to the home position. The refuse collection vehicle may then proceed to another collection site and the procedure is repeated.

The refuse collection truck or vehicle is provided with a plurality of different storage bins or compartments each of which is designed to receive a particular waste component such as glass, aluminum cans, paper, plastics or the like. A plurality of refuse containers are located at each stop along the route and each container preferably has indicia means for identifying the particular contents of that container.

While systems such as the foregoing, particularly the Flexi-Dump system described immediately above, have substantial advantages and do, in fact, provide improved refuse collection systems having a plurality of bins for segregating the various components of waste such as glass, aluminum cans, paper and the like, such systems are not completely automated collection systems utilizing a single on-site collection container. These systems generally require that the waste collection location be provided with a plurality of containers for the different waste and each container is either manually or automatically located into a compartmented container. Such systems require a substantial investment in containers which can impose a prohibitive capital investment requirement on a collection agency such as a governmental subdivision. Further, if the waste collection system is a domestic system, the home owner is burdened with a plurality of containers which occupy space and which must be manually transported periodically such as weekly or semi-weekly to a collection location on a street or alley for pick-up. This type of system generally involves manual dumping of the individual collection containers into the collection vehicle which is labor-intensive.

SUMMARY OF THE INVENTION

In view of the foregoing, there exists a need for an improved waste collection system which incorporates an on-site container which is compartmented to receive and separately store the various waste components for the convenience of the consumer. The container is lifted and dumped in a single operation by an operator-controlled loading system which dumping operation inherently segregates or classifies the waste components within compartments in the collection vehicle so that recyclables such as glass, aluminum, paper and the like are separated from nonrecyclables. It is also a principal object of the present invention to provide a compartmented collection vehicle having compaction system for compacting the contents of the various compartments in the collection vehicle.

It is another object of the present invention to provide a container for on-site waste storage having a plurality of compartments each of which is designated to receive a particular waste component such as glass, aluminum cans, paper and the like.

It is still another object of the present invention to provide a waste collection vehicle having a trailer with compartments cooperable with the on-site collection container and further including a loader apparatus which delivers the on-site container from a home position to a dump position so that in the dump position, the contents of the various compartments of the on-site container are diverted to separated, designated compartments within the collection vehicle.

It is still another object of the present invention to provide a waste collection system as described above in which the loader apparatus may be either a side loading system, a rear loading system or a front loading system.

It is a broad object of the present invention to provide an economically beneficial waste collection system which will result in a cleaner environment and will conserve valuable natural resources.

DESCRIPTION OF THE DRAWINGS

The above and other objects and advantages of the present invention will be more fully understood and appreciated from the following detailed description of the preferred embodiments of the present invention taken along with the claims and drawings in which:

DETAILED DESCRIPTION OF THE INVENTION

Figures 1, 1A, 2, 3:
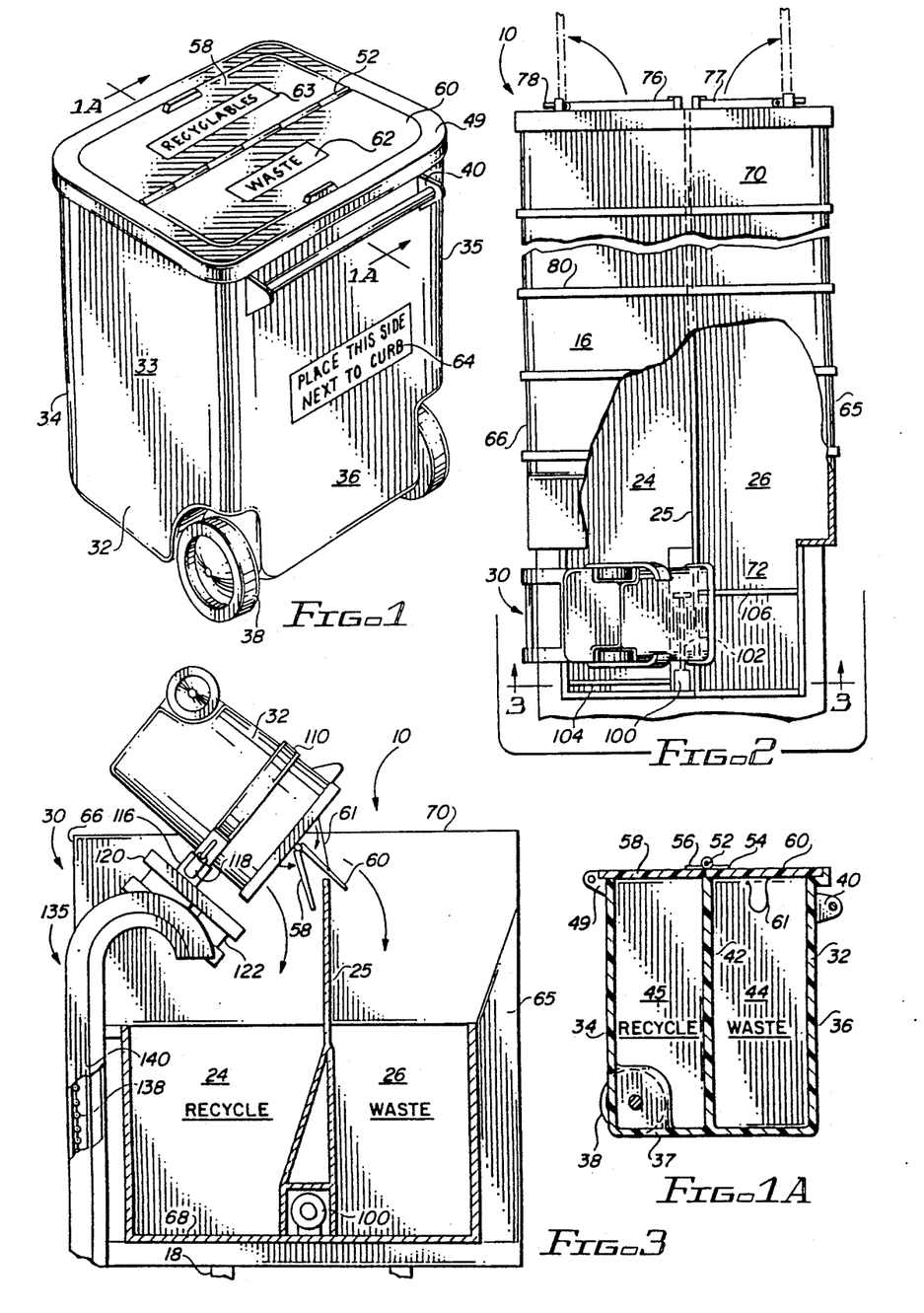
FIG. 1 is a perspective view of an on-site refuse container which comprises a part of the system.
FIG. 1A is a sectional view of the container of FIG. 1 taken along lines 1A—1A of FIG. 1.
FIG. 2 is a top view, partly broken away, of the waste collection trailer.
FIG. 3 is a sectional view taken along lines 3—3 of FIG. 2.

Turning to the drawings, a preferred embodiment of the waste collection and recycling system of the present invention is shown in FIGS. 1 to 4 and is generally designated by the numeral 10. Briefly, the system includes a mobile collection vehicle 12 with a truck 15 having a compartmented trailer 16 which is carried on a chassis-mounted bed 18 carried on axle and wheel assembly 19. The trailer is partially open having longitudinally extending compartments 24 and 26, separated by longitudinally extending partition 25. A side mounted loading or lift assembly 30 delivers the on-site refuse container 32 from a home position on the ground to an elevated dump position above the open top section of trailer 16 as seen in FIG. 3.

The foregoing general description of the components of the preferred embodiment will facilitate a general understanding of the present invention. A more detailed description of the components and their construction, operation and interaction follows.

The system of the present invention is for a collection of waste or refuse which contains a number of components such as food waste, yard waste, aluminum cans, glass, paper and the like. With conventional collection systems, these materials are either collected as a conglomerate and placed in a landfill or presorted in some fashion, as for example, in separate containers and then manually or through a lift system placed in separate bins or compartments in a refuse collection vehicle. With the present invention, the on-site waste or refuse container is compartmented to receive the various refuse components in the separate compartments and is cooperable with the collection vehicle to inherently segregate the waste components into separate compartments during the dumping procedure. While the system of the present invention is described primarily with reference to residential or domestic waste collection, the system is also applicable to commercial collection systems.

The collection site is provided with one or more collection containers 32. For example, each residence or collection site would be provided with one or more containers 32 for receipt of refuse. The collection containers are compartmented and are best shown in FIGS. 1 and 1A. Each container is provided with side walls 33, 34, 35 and 36 extending from a generally flat bottom 37 and having an open upper end with a peripheral rim 49 for strength. The container may be generally cylindrical in cross section or may be generally rectangular as shown. For residential use, these containers are provided in various size, typically being between 90 gallon and 120 gallon. Some systems use residential containers having capacities as much as 300 gallons. The containers may be fabricated from various materials although for light-weight and durability, flexible materials such as carbon fiber reinforced polyethylene or polypropylene is preferred. In many domestic applications, the containers are provided with axle-mounted wheels 38 at one side so that the homeowner can tilt the container and easily transport the container from one location to another. Generally, the homeowner is required to move the container to a collection or pick-up site on a street or alley weekly or biweekly. A handle 40 is conveniently provided on the rear of the container to assist the homeowner in transporting the container.

Container 32 is provided with a transverse partition 42 extending between opposite side walls 33, 35 which divides the container into a rear compartment 44 and a forward compartment 45. For purposes of the present invention, the front compartment 45 is designated the compartment for containment of specified recyclables such as metal, glass and plastic and the rear compartment 44 is designated as the compartment for containment of food, yard and other disposable waste.

The container has a hinge 52 at the upper end of the container extending transversely between sections of the rim and generally aligned with the partition 42. The hinge is shown as being of the piano type having opposite leaves 54, 56. A cover 58 is secured to a hinge leaf 56 and cover 60 is secured to hinge section 56. Cover 58 in the closed position encloses compartment 45 and cover 60 in the closed position covers compartment 44. The covers are provided for sanitary reasons and keep out moisture, scavenging animals and reduce odor. Both of the covers 58, 60 pivot inwardly toward the center of the container to provide access to the associated compartment. A stop in the form of a tether 61 extends between the upper end of the container and the edge of cover 60 to limit the pivotal movement of cover 60 to a position approximately aligned with partition 42. The covers carry indicia 62 and 63 which respectively read "Waste" and "Recyclables" indicating to the user the contents of the associated subjacent compartments 44 and 45. Also, indicia 64 is carried on the container 32 to indicate proper orientation of the container at the time of collection.

In use, containers 32 are provided at the waste collection site, as for example, one or more is provided to each individual homeowner. The homeowner generally positions the container at a convenient location at the residence and periodically moves the container to a pick-up location along a street or alley. Container 32 carries suitable indicia, as for example, on the exterior of the cover panels 60 and 62 indicating that one compartment of the container is for receipt of recyclables such as metal, glass and plastic, while the other compartment is designated for receipt of garbage and waste such as food waste and yard material.

Figure 4:
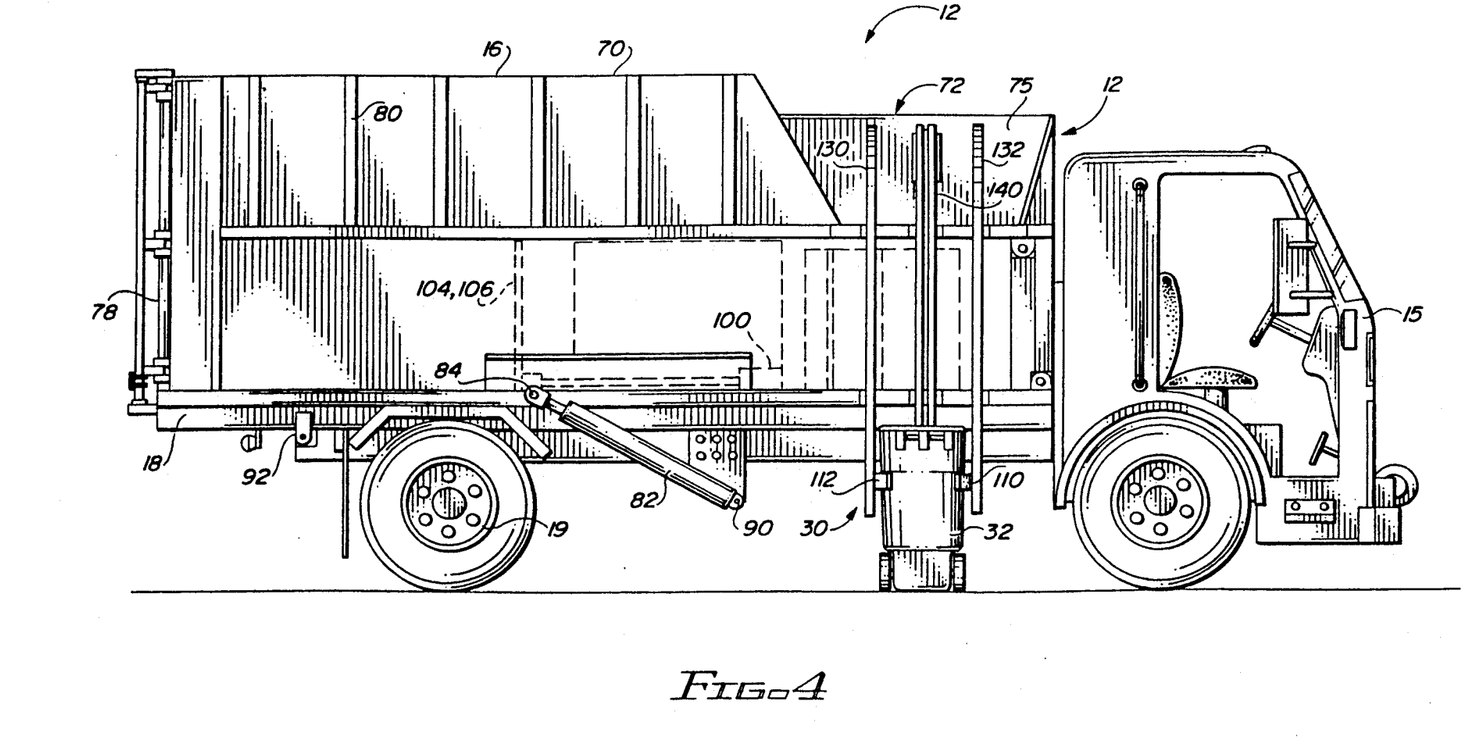
FIG. 4 is a side view of the collection vehicle, truck and trailer.

The mobile collection vehicle 12 has a trailer 16 with opposite side walls 65 and 66 longitudinally and vertically extending from floor 68 at opposite sides of the frame or chassis 18. A top 70 extends over a substantial portion of the trailer. A hopper section 72 is provided at the forward end of the trailer and is shown as having an upper edge 75 below the elevation of the roof 70. Hopper 72 is open whereas the rear portion of the trailer is provided with a generally horizontally extending roof section 70 to keep out moisture and to prevent the contents of the trailer from being blown away. The trailer is separated by a longitudinal divider wall 25 into adjacent chambers 24 and 26. Each of the interior chamber 24 and 26 is provided with a rear tailgate door 76 and 77, respectively. Each of the doors 76, 77 have a hinge assembly 78 extending vertically at the outer edge of the door so the doors open outwardly. A suitable latching mechanism is provided with each door. The tailgate doors may also be hinged to open upwardly or downwardly as the case may be. The entire trailer includes suitable spaced-apart structural reinforcement members 80. The trailer is fabricated from suitable material such as sheet steel and may be of welded or bolted construction. The entire trailer is attached at a central location to hydraulic cylinder 82 which has its rod end connected at a clevis or pivotal connection 84 to the trailer bed 18. The opposite end of the cylinder is pivotally connected to the trailer at clevis 90. Trailer 16 is pivotally connected to the chassis at pivot pin 92. Extension of the rod of hydraulic cylinder 82 will cause the entire trailer to tilt rearwardly to assist in moving the contents of the trailer rearwardly through doors 76 and 77 for dumping.

As pointed out previously, a longitudinally extending partition or divider 25 subdivides the trailer into two compartments, although additional compartments may be provided. A hydraulic ram 100 is located forward of the hopper 68 having an extensible rod 102. A pusher plate 104 is reciprocal within compartment 24 being connected to rod 102. Similarly, pusher plate 106 is also connected to rod 102 and reciprocal within compartment 26. In the withdrawn or retracted position, the pusher plates occupy a position at the forward end of hopper 72. As trash is deposited into the hopper and the subjacent compartments, the pusher plates may be moved rearwardly by actuation of ram 100 causing rearward compaction of the refuse.

The loading assembly 30 is shown in detail in FIGS. 2, 3 and 4. The loading assembly 30 includes a pair of gripping arms 110 and 112 which engage the container 32. The gripping arms are movable from an open position to receive the container to a closed position gripping the sides of the container being pivotal at connection 116 and operated by a pair of actuators 118. The gripping arms are mounted on a carriage device 120 which includes an extension member 122 which in the preferred embodiment is shown as a plurality of interconnected scissors links permitting the gripping arms to be moved laterally outward from the side of the vehicle. The particular configuration of the gripping arm may vary and is selected in accordance with the size and shape of the container 32.

The carriage device is vertically movable from a lowered "home" position as shown in FIG. 4 to a "dump" position as shown in FIG. 2 in which the contents of the container 32 are caused under influence of gravity to fall into the appropriate compartment of the subjacent trailer 16. Various well-known lift mechanisms for elevating and moving the container between the lowered position to the dump position can be found in the prior art including hydraulic, pneumatic and mechanical systems. Any of these well-known lift mechanisms can be used in connection with the present invention, however, for purposes of illustration a mechanical system is shown in which a pair of vertically extending parallel rails 130 and 132 are shown on the exterior of truck side 66 in the area adjacent hopper 68. The carriage includes a pair of carriage wheels, not shown, engaged with the track members 130 and 132. A drive system 135 extends vertically between the tracks or rails 130 and 132 having a chain 138 within housing 140. One end of the drive chain 138 is connected by appropriate supports to the carriage. The chain extends within a housing 140 having interior and outer section and track guide sections have a curved or arcuate upper end. When the chain drive assembly is actuated, the drive chain 138 will move upwardly in the outer guide channel in the housing moving the carriage device from the down position to the up, dump position. When the container has reached the upper dump position, it is brought to a sudden stop which due to the momentum of the refuse in the container and the effect of gravity will cause the refuse to be dumped or emptied from the container.

It will be observed in FIG. 3 that in a dump position, container 32 assumes a cooperative position with respect to the partition 25. Container covers 58, 60 are disposed on opposite sides of the partition to cause the contents of the container compartments 42, 44 to be deposited in the separated compartments 26, 24 of the trailer. Cover 60 is provided with a stop 61 so that in the open, dump position the cover 60 assumes the position generally co-planar with internal baffle 42 of container 32. Thus, the waste material within compartment 44 will move along the divider and the interior side of cover 60 to be directed into trailer compartment 26. Similarly, the recyclable material in container compartment 42, will move along the interior side wall of compartment 42 and drop directly into compartment 24. Cover 58 assumes a generally vertical position due to gravity and is positioned on one side of partition 25 opposite cover 60.

Once container 32 is emptied, the reverse cycle is initiated and the carriage assembly is actuated through the drive system 135 to cause the container to be moved downwardly along the tracks to the home position resting on the ground. The gripping arms 110, 112 are then opened to release the emptied refuse container 32 and the extension mechanism 122 is retracted to the home position adjacent the carriage. The truck may then move to another site to pick up other refuse containers at that location. This procedure is repeated until the trailer is full or the route completed with the recyclable materials being contained in one compartment 24 and the nonrecyclable garbage or waste material in the other compartment 26 in the trailer. In order to increase the capacity of the truck, the hydraulic ram 100 may be periodically actuated by the operator to rearwardly compact the waste making additional space available in the forward hopper. The ram may extend substantially the entire distance of the trailer or preferably need only extend to a position rearward of the forward hopper 72 as material contained in the compartments will transfer the compaction force rearwardy.

When the collection vehicle is full, vehicle 12 returns to a central refuse collection facility dump site wherein the compartments are emptied either at the same time or separately. The waste in the waste collection compartment 26 can be directly dumped into a landfill and the recyclable materials in the adjacent compartment 24 may be emptied and taken to a recycling center. The entire trailer may be hydraulically tilted and tail gates 76, 77 opened so the waste material flows out the rear of the trailer. At the recycling center, these materials will be further segregated either manually or by means of automatic segregation systems, as for example, systems which utilize magnetic and air classification systems to further separate the various waste components.

The details of the loading system as shown are well known in the art and various systems may be used. However, a loading system of the general type is described in patent application Ser. No. 07/281,558, entitled "Improved Refuse Collection Syste, Refuse Collection Truck and Load Assembly Therefor", filed Dec. 8, 1988 now U.S. Pat. No. 5,007,786. Similarly, the details of the hydraulic and electrical components of the system are well known and in the interest of brevity, it is not necessary to set them forth in detail. Further detailed description of these components can be found in the cited patent application.

An alternate embodiment of the present invention is shown in FIGS. 5 to 9 and is generally designated by the numeral 200. System 200 again includes a collection vehicle having a mobile trailer 202 similar to that described above which has a divider or partition 205 separating the trailer in a first longitudinally extending chamber 204 to receive recyclable materials and a second longitudinally extending chamber 206 for receipt of waste or nonrecyclable materials. The on-site container 220 may be made of a suitable light weight, sturdy material such as an injection molded polyethylene or polypropylene plastic and, as will be explained hereafter, has multiple compartments including one for reception of waste paper materials.

Figure 7:
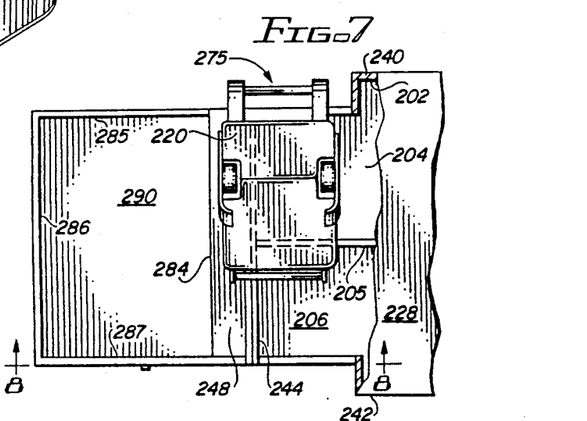
FIG. 7 is a plan view of a portion of a modified form of the collection vehicle in a dump position.

The trailer 202 is shown as being generally rectangular having opposite side walls 240 and 242, front wall 244, and a rear wall, not shown, with tail gates at the end of each of the chambers 204, 206. A cover or roof section 228 extends over compartments 204 and 206 terminating at a location leaving access chute 246 into compartments 204 and 206. An angular deflection plate 245 may be associated with opening 246 to direct material into the compartments. A hydraulic ram 280 is mounted in the forward end of the trailer having a rod 282 operatively connected to pusher plates 270 and 272 in compartments 204 and 206, respectively. In the retracted position, the pusher plates occupy a position immediately adjacent front wall 244. Upon actuation of the hydraulic ram, the pusher plates will move rearwardly tending to compact the material in the compartments.

Loading mechanism 275 may be a hydraulic, pneumatic or other system such as the mechanical chain drive assembly described above. The lift system includes a pair of parallel, spaced-apart tracks attached to side wall 240 in the area adjacent access opening or chute 246. A carriage and extension assembly are moved up and down the track by means of a drive assembly. The carriage assembly carries opposite gripper arms, not shown, which are controllable to engage and grasp the outer circumference of the container body. The details of the loading assembly are not specifically set forth as they have been previously described. In a preferred embodiment, the trailer is pivotally mounted on the chassis and tilted by means of hydraulic ram mounted on the undercarriage to assist in off-loading the contents of the trailer.

Figure 9:
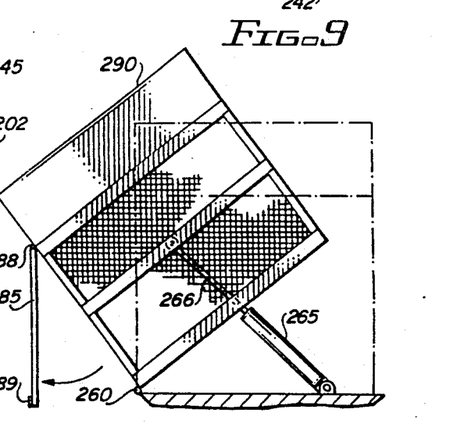
FIG. 9 is a front view of the collection trailer illustrating the waste collection bin in a discharge position.

Forward of wall 244 is a generally rectangular bin 290 having side walls 284, 285, 286 and 287 upstanding from floor 281. Bin 290 has an open top and is preferably fabricated from expanded metal or wire mesh for reduced weight. Side wall 285 is hinged at 288 having a lower latch 289. The bin 290 is pivotally attached to the trailer at connection 260. Ram 265 has extensible rod 266 which is operable to laterally tilt bin 290 as shown in FIG. 9. When side wall 285 is unlatched, material in the bin will flow downwardly and be expelled.

Figure 5:
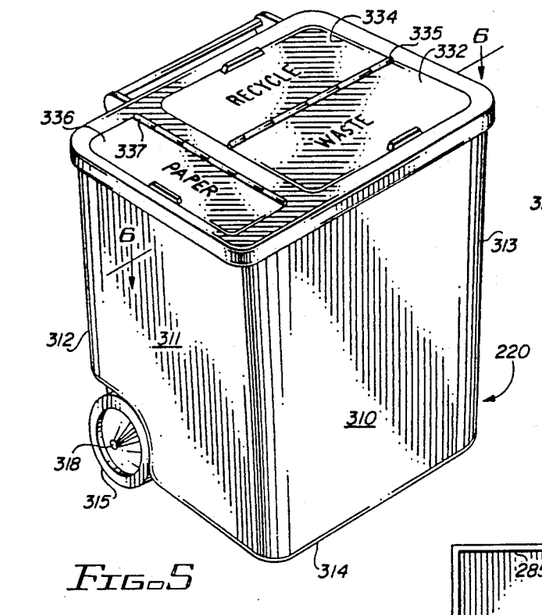
FIG. 5 is a perspective view of an alternate embodiment of the on-site collection container.
Figure 6:
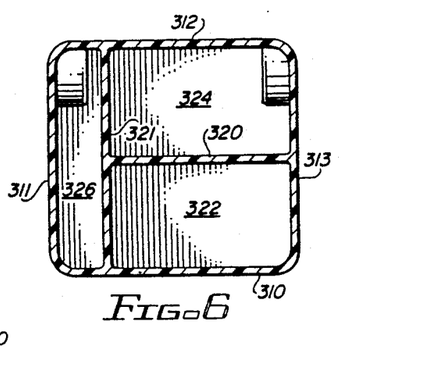
FIG. 6 is a sectional view taken along lines 6—6 of FIG. 5.

Container 220 is best seen in FIGS. 5 and 6. The container has side walls 310, 311, 312 and 313 extending upwardly from bottom 314. Wheels 315 are mounted on an axle 318 at the lower end adjacent rear side wall 312. As best seen in FIG. 6, the interior of container 220 is provided with an upstanding partition or divider 321 extending between walls 310 and 312. Another partition 320 extends laterally between divider 321 and side wall 313. Accordingly, the interior of the container is subdivided into a plurality of chambers 322, 324 and 326. The latter chamber 326 extends from the front to the rear of the container at one side. Lid or cover 332 opens rearwardly on hinge 335 enclosing compartment 322 which is intended for waste materials. Similarly lid or cover 334 is hinged at 335 and opens forwardly to provide access to chamber 324 which stores recyclable materials. Cover or lid 336 is pivotal at hinge 337 and provides access to compartment 326 which is intended for storage of waste paper materials.

In use, one or more containers 220 are located at the domestic or commercial collection area and the user deposits the waste in the appropriate chamber 322, 324 and 326. Recyclable material, waste paper and non-recyclable materials are separated and stored in the appropriate chamber. In accordance with collection schedules, the container is manually moved to pick up location on the street or alley. The collection vehicle proceeds along its route until it reaches a pick up location. At that point, the vehicle positions itself adjacent the container 220 with the lift mechanism 275 adjacent the container. The operator in the cab, through operation of the appropriate controls, will cause the gripping arms to extend to grasp the container and then retract against the carriage. The lift mechanism is actuated lifting the container from the home position on the ground to the dump position shown in FIG. 8 and 9.

Figure 8:
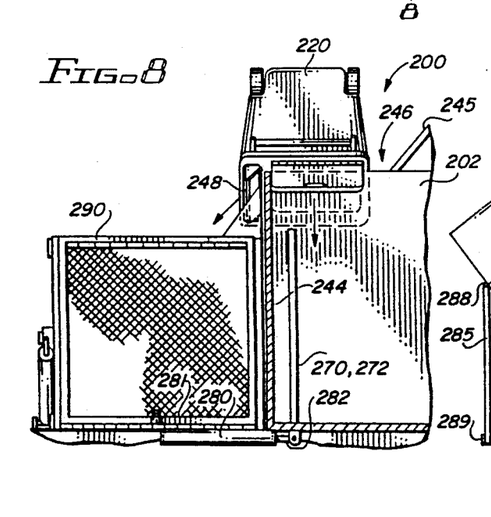
FIG. 8 is a partial side view, partly in section, of the collection vehicle and on-site waste container in a dump position in connection with the trailer and auxilliary bin.

With the container in the dump position, the container is in a generally inverted position over chute 246 with covers 332 and 334 disposed on opposite sides of divider 205. The inverted position will cause the nonrecyclable materials to flow from compartment 324 and drop downwardly into the subjacent chamber 204 of the collection vehicle. Similarly, recyclable materials in compartment 322 will flow downwardly into subjacent chamber 206. The waste paper materials in the side compartment 336 of the container will drop downwardly and be deflected by chute 246 into the forward bin 290. The relationship of the container compartments to the trailer chambers in the dump position inherently causes the waste materials to remain segregated as they fall into the separate trailer compartments. The collection vehicle then proceeds to its next designated pick-up station and the collection procedure is repeated until the trailer is full or the route is completed. Periodically, the contents of chambers 204 and 206 are compacted by ram 280 and the associated compaction plates 270, 272.

When the vehicle returns to the central area, the forward bin 290 may be dumped by tilting the bin through actuation of cylinder 265 to cause the contained paper materials to flow from the opening in side wall 285. After emptying, the forward bin is returned to its normal position on the chassis of the collection vehicle. The rear chambers 204 and 206 are emptied by expelling the material either through use of the ram 280 or by rearwardly tilting the trailer or a combination of these operations.

Figure 10:
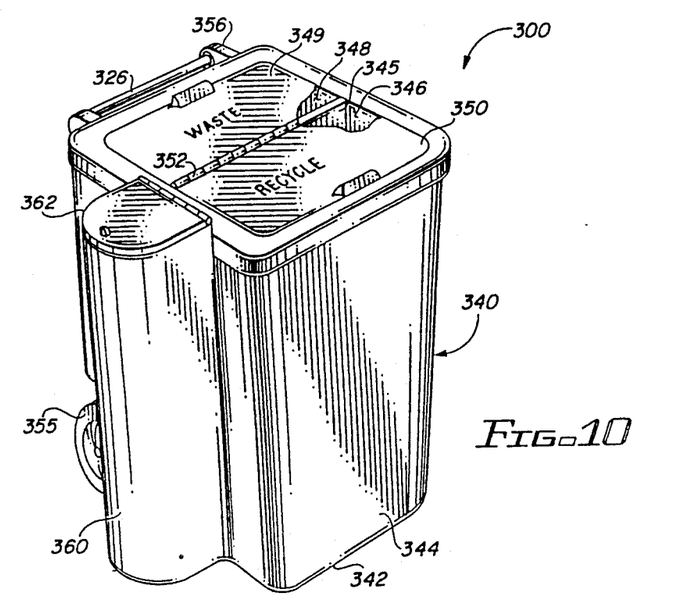
FIG. 10 is a perspective view of an alternate embodiment of an on-site waste collection container according to the present invention.
Figure 11:
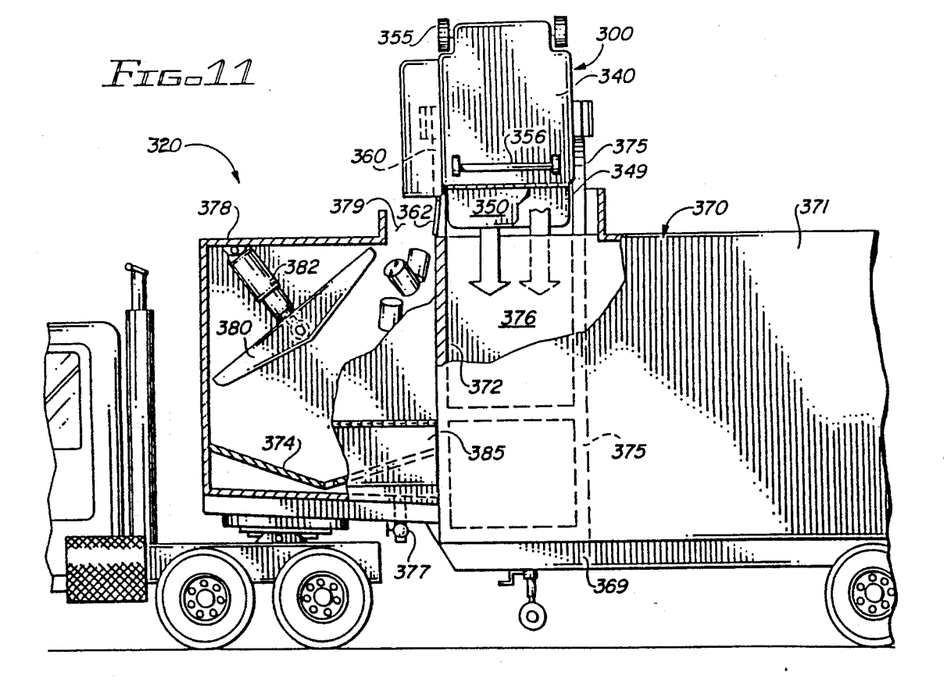
FIG. 11 is a partial side view, partially in section, showing the container of FIG. 10 in a raised, dump position in cooperation with the waste collection vehicle having a trailer and auxilliary bin.

FIGS. 10 and 11 show still another embodiment of the present invention generally designated by the numeral 300. In this embodiment, the on-site container 340 and the collection vehicle 320 are cooperatively designed to segregate the waste material from recyclable materials. In addition, liquid waste such as used or spent motor oil is separated and deposited in a holding tank on the collection vehicle.

In FIG. 10, the on-site container 340 has a bottom 342 with upstanding side walls 344 defining a body having an interior which is subdivided by a transverse partition 345 into compartment 346 for reception of recyclable materials and adjacent compartment 348 for reception of waste materials. Lids or covers 349 and 350 are operably connected to transverse hinge 352 and may be opened either to deposit material in the compartments or for emptying of the subjacent compartments 346 and 348, respectively. Container 340 is preferably a mobile cart being mounted on wheels 355 and provided with a handle 326 at the rear for the convenience of the user. One side of the container 340 is provided with a vertically-extending, sleeve-like compartment 360. Compartment 360 preferably has an upper edge 362 which extends vertically beyond the upper edge of the main container body. Compartment 330 is sized for reception of conventional motor oil containers such as the one quart size commonly sold to consumers.

It is common for homeowners to replace the motor oil in the crank case of vehicles and a particular problem arises with disposal of the drained or removed motor oil. With the present invention, the user may drain the crank case into a pan or other container and place the used motor oil in the original containers for the replacement motor oil after they have been emptied. These containers, filled with discarded motor oil, can be stacked in the cannister or sleeve-like compartment 360. As will be seen, this motor oil is separately recovered in the collection process and may be delivered to a recycling center for re-use.

FIG. 11 shows a portion of a collection vehicle generally designated by the numeral 320, again having a side-mounted loading apparatus 375 for elevating the on-site container 340 from a home position to the inverted dump position as shown in FIG. 11. The collection vehicle has a trailer 371 mounted on a mobile chassis 369. A longitudinally extending partition or divider 376 extends rearwardly from end wall 372 and subdivides the trailer into side-by-side longitudinally extending chamber as has been previously described. In the dump position, container 340 is elevated to an inverted position so the contents of waste compartment 348 fall into one of the longitudinal chambers and the recyclable materials in the compartment 316 of the on-site container fall into the other compartment of the collection vehicle.

Chassis 369 carries a holding tank 370 ahead of wall 372. The tank preferably has an inclined floor 374 forming a sump which is connected to a suitable drain 377. As seen in FIG. 11, when the container 340 is in the dump position, the open end of the sleeve 360 is disposed over funnel opening 379 allowing the contents of the sleeve to be discharged into the tank. The waste oil will collect in the tank along with the containers. A compactor 380 actuable by a suitable hydraulic ram 382 may be provided within the tank which compactor will crush the cans to expel all of the oil from the cans. The tank 370 and its contents may be removed from the collection vehicle chassis and transported to an oil recycling center or, in the alternative, the contents of the tank may be removed via drain 377 to a transportation vehicle. Once the oil has been removed, the crushed containers may be removed from the tank interior at inspection hatch 385.

Thus, with the embodiment of the invention shown in FIGS. 10 and 11, waste oil can be recovered for re-use for economic benefit. Other benefits include the avoidance of environmental problems of disposal of the oil by the homeowner or problems due to contamination of other waste materials with waste oil.

Figure 12:
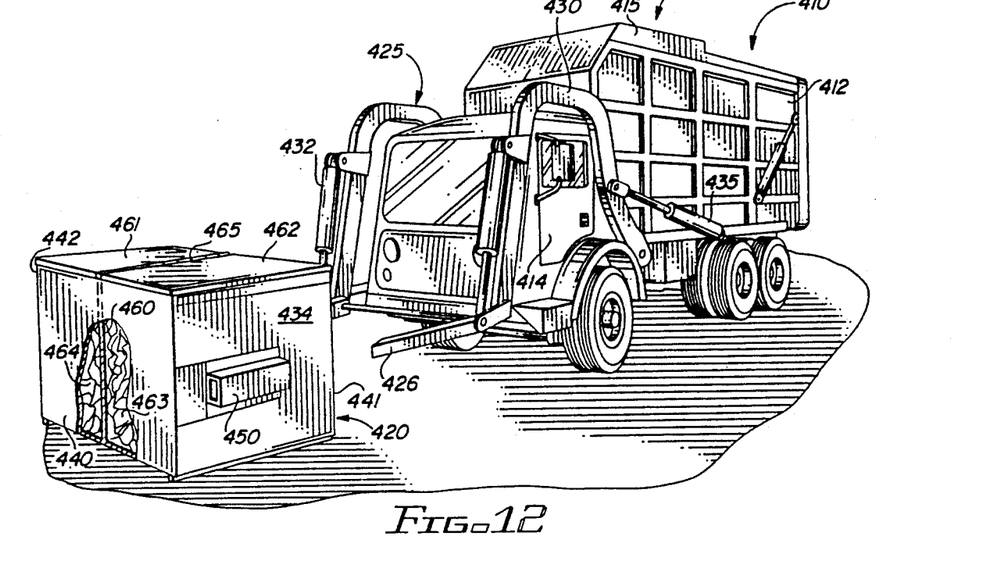
FIG. 12 is a perspective view of another embodiment of the collection system of the present invention in which the collection vehicle is of the front-loading type.
Figure 12A:
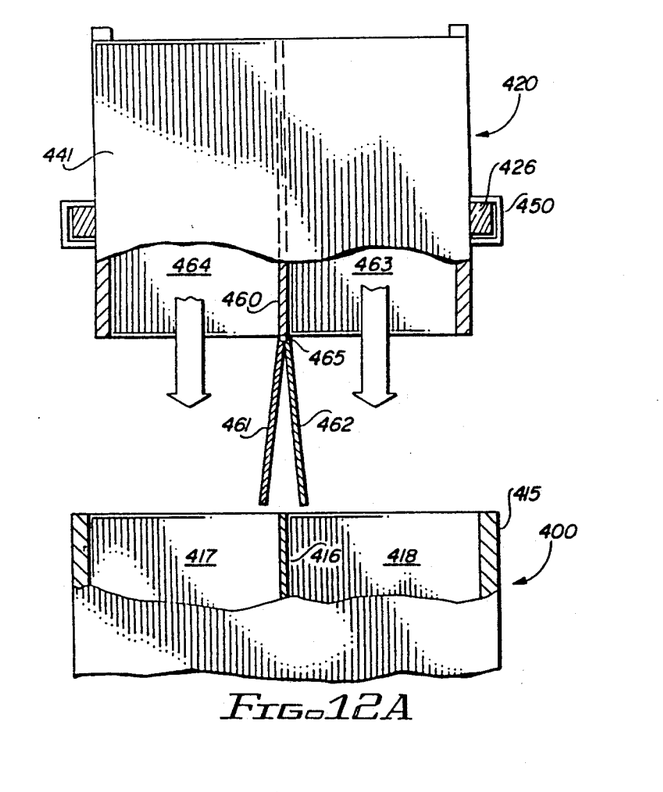
FIG. 12A shows the container of FIG. 12 in an inverted position over the collection trailer.

FIGS. 12 and 12A show another embodiment of the present invention generally designated by the numeral 400. In this embodiment, the waste collection vehicle 410 and the on-site collection container 420 are more particularly adapted for the commercial collection of waste materials. The collection vehicle 410 has a trailer 412 which is towed by truck 414. Trailer 412 includes an open chute 415 at its forward end which provides access to the interior of the trailer. The trailer interior is divided by longitudinally extending vertical partition into side-by-side chambers, each for reception of a different type of trash as has been previously explained. The loading or lift apparatus 425 is of the front-loading type having a pair of forwardly extending fork members 426 which are pivotally mounted on the lower end of arms 430. The individual forks 426 are positionable by hydraulic actuator 432. Arms 430 are movable from the position shown in FIG. 12 by means of hydraulic actuators 435 to an elevated position so that the contents of the container supported by the forks 426 will be emptied into the collection vehicle trailer through chute 415.

The on-site containers 420 are generally rectilinear having front and rear walls 440, 441 and opposite side walls 442 and 443 extending upwardly from a generally planar floor 445. The opposite side walls 442 and 443 are provided with lifting lugs or brackets 450 which are engageable with forks 426 to lift the container.

Container 420 is divided by a partition 460 extending between front and rear walls 440 and 441 dividing the interior of the container into multiple compartments 463, 464. Cover members 461 and 462 are connected to hinge member 465 which extends between the front and rear side walls generally aligned with the upper end of partition 460. Covers 461 and 462 protect the contents of the container from moisture and from scavenging animals and may be lifted to provide access for deposit of materials. Note that one of the compartments 463 is for nonrecyclable waste and the other compartment 464 is for containment of recyclable materials.

In the collection procedure, the truck positions itself adjacent the container 420 and the operator through controls in the cab extends the forks 426 to engage the lifting lugs 450. Hydraulic actuators 435 are pressurized, causing the arms 430 to raise elevating the container to an inverted position over the chute or opening 415. In this position the hinged covers 461 and 462 will, due to the influence of gravity, open to a generally vertical position. In this position, partition 460 of the on-site container 420 is generally aligned over the rearwardly extending partition 416 in the collection vehicle trailer so that the recyclable contents of the compartment 464 fall into one chamber 417 within the collection vehicle and the nonrecyclable waste materials fall into the adjacent chamber 418 of the collection vehicle. Therefore, in the collection process, the recyclables are segregated from the nonrecyclables for reuse. The arms 430 are returned to the position shown in FIG. 12 and the truck reversed to disengage the forks 426 from their associated lifting lugs.

At the centralized waste collection depot, the recyclable materials are removed for recycling and the waste material is transported to a landfill with the end result that the amount of material delivered to the landfill is substantially reduced. Also, there is substantial economic benefit in separating the recyclables as they can be sold at substantial profit for the collection operator, be it a private operator or governmental subdivision.

Figures 13, 14, 15, 16, 17, 18, 19:
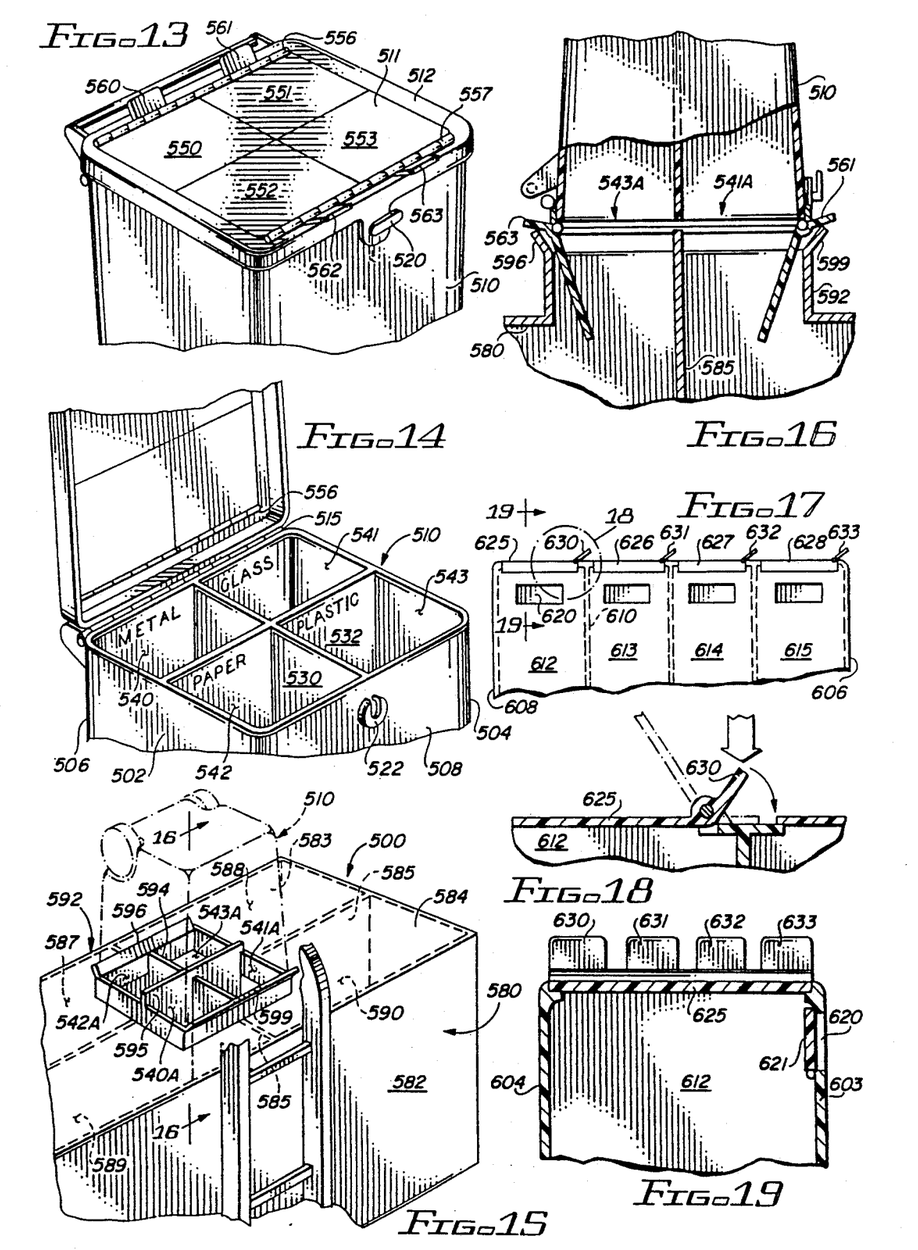
FIG. 13 is a partial perspective view of a modified form of the on-site container in a closed position.
FIG. 14 is a view similar to FIG. 13 showing the container in an open position.
FIG. 15 is a partial perspective view of the collection vehicle for use with the on-site container shown in FIGS. 13 and 14.
FIG. 16 is a partial sectional view taken along lines 16—16 of FIG. 15.
FIG. 17 is a partial side view of still another form of the on-site storage container.
FIG. 18 is a detail view of a portion of the on-site container as indicated in FIG. 17.
FIG. 19 is a sectional view taken along lines 19—19 of FIG. 17.

FIGS. 13 to 16 show still another embodiment of the present invention generally designated by the numeral 500 having an on-site storage container 510 which is shown as being generally rectangular having opposite side walls 502, 504, rear wall 506, and front wall 508. Container 510 is shown as being generally rectangular but may be other geometric shapes. Cover 511 has a rectangular rim 512 having a lip overlapping the upper edges of the side walls, front wall and rear wall. Cover 511 is hinged at 515 and opens rearwardly as seen in FIG. 14 providing access to the interior of the container. A latch member 520 is cooperable with a latch plate 522 on the exterior of front wall 508. The entire cover 511 can be accordingly locked in place. Preferably, latch 520 is spring biased to a normally locked position so cover 511 will be automatically locked when placed in the down position.

As best seen in FIG. 14, the interior of the on-site storage container is subdivided into a plurality of compartments. A longitudinally extending partition 530 extends between the front and rear walls and laterally extending partition 532 extends between opposite side walls subdividing the interior into compartments 540, 541, 542 and 543 which have been labeled for reception of metal, glass, paper and plastic, respectively. A hinge 556 extends transversely along rim 512 at the rear edge thereof. Doors 550 and 551 are secured to hinge member 556 and open rearwardly. Door 550 extends over the upper end of compartment 540 and door 551 extends over the upper end of compartment 541. Tab 560 extends from the rear edge of cover 550 disposed at an angle with respect to the cover. Similarly, tab 561 extends rearwardly from door 551. Door 552 is hinged at its front edge to transversely extending hinge member 557. Similarly, door 553 is hinged at a forward edge to hinge 557. Doors 552 and 553 extend over compartments 542 and 543, respectively, which are labeled "paper" and "plastic". Tab 562 extends forwardly from the door 552 and tab 563 extends forwardly from the cover 553. Each of the door members 550, 551, 552, and 553 are biased by a hinge spring member associated with the hinges 556 and 557 to a normally closed position.

The collection vehicle is designated by the numeral 580 and is shown in FIG. 15. The collection vehicle again includes a trailer-like compartment having opposite side walls 582 and 583 and a tailgate 584 defining an interior compartment. The interior compartment is divided by longitudinally extending partition 585 and transversely extending partition 586 into quadrants establishing subcompartments 587, 588, 589 and 590. A loading mechanism is provided or associated with the vehicle on the exterior of wall 582 for lifting the on-site container 510 from a home position on the ground to a dump position shown in dotted lines in FIG. 15. A divider member 592 is provided in the roof of the collection vehicle. The divider member is shown as being generally rectangular having a perimetric configuration generally conforming to that of the cover of the on-site container. The divider member is provided with transversely extending partition 594 and a longitudinally extending partition 595 establishing openings 540A, 541A, 542A and 543A dimensionally corresponding to compartments 540, 541, 542 and 543. A longitudinally extending flange 596 is provided at one longitudinal side of the divider member. Similarly, another flange 599 is provided at the opposite longitudinal side of the divider member. The flanges are disposed at a generally acute angle with respect to the roof of the trailer and are adapted to engage the operator tabs 560, 561, 562 and 563. As best seen in FIG. 16, when container 510 is elevated by the loading mechanism to the dump position, the container assumes a generally inverted position immediately above the divider member 592. As the container is lowered into engagement with the divider member, flange 596 will engage tabs 562 and 563 causing doors 552 and 553 to open. Similarly, the oppositely disposed flange 599 will engage the associated tabs 560 and 561 causing doors 550 and 551 to open. The contents of these compartments will fall under influence of gravity through the divider 592 and into the appropriate compartment in the vehicle inherently classifying the waste materials by type of material.

FIGS. 17 through 22 show another embodiment of the collection system of the present invention which is designated by the numeral 600. The on-site collection container is generally rectilinear having front wall 603, a rear wall, not seen and opposite side walls 606 and 608. Container 602 is divided into a plurality of compartments by transverse dividers or partitions 610 which establish compartments 612, 613, 614 and 615. An opening 620 is provided in the front wall 602 of the container at each compartment and the opening is provided with a panel 621 which is pivotally mounted to the interior of each compartment and normally spring biased in the closed position as shown in FIG. 19. The upper end of each of the compartments 612 to 615 is provided with a door 625, 626, 627 and 628. Each of the doors are hinged at a longitudinally extending hinge member as best seen in FIG. 18. The hinge is spring-loaded so that the doors 625 to 628 are normally held in the closed position. A tab 630 projects upwardly at one end of the door 625 as best seen in FIG. 18. Sufficient opening force against tab 630, will cause door 625 to pivot to an open position. Similarly constructed tabs 631, 632 and 633 are associated with doors 626, 627 and 628. As best seen in FIG. 19, it will be seen that the tabs are transversely spaced apart or offset from one another.

Figures 20, 21, 22:
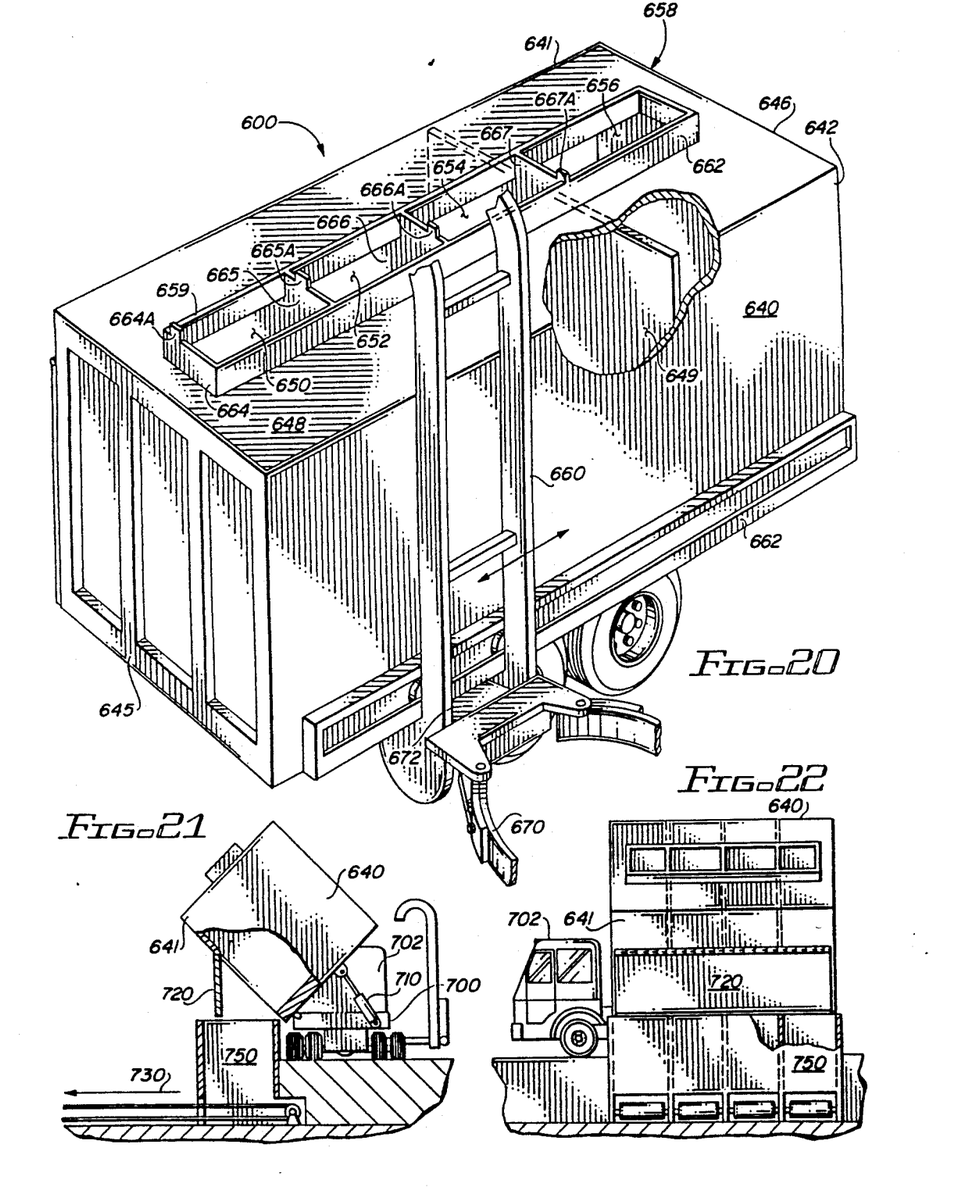
FIG. 20 is a perspective view of a collection trailer adapted for use with the on-site storage container shown in FIGS. 17 to 19.
FIG. 21 is a rear view of the trailer of FIG. 20 illustrating the dumping procedure at a refuse depot.
FIG. 22 is a side view of the dumping procedure for the segregated waste materials.

Collection vehicle 640 is best shown in FIG. 20. The collection vehicle includes a mobile trailer unit generally as has been described above having opposite side walls 641 and 642, front walls 645 and tailgate 646 upstanding and defining an interior compartment. A roof 648 extends over the compartment. A plurality of baffles 649 extend transversely within the compartment of the collection vehicle subdividing the collection vehicle into chambers 650, 652, 654 and 656. Loading mechanism 660 is has been described above for elevating the container from the home to the dump position. The loading mechanism 660 may be fixed or may be longitudinally movable along track 665 to transversely align with selected of the chambers 650, 652, 654, and 656 in the event the contents of a single container are to be dumped into a selected chamber.

However, in the event an on-site container such as that shown in FIGS. 17 to 19 is utilized with collection vehicle 640, the dumping operation intrinsically separates the trash into preselected components. Accordingly, a divider or classifier member is associated with the collection vehicle and includes a generally rectangular frame 662 extending longitudinally of the collection vehicle. A partition 664 extends transversely of frame 662 at the front end of compartment 650. Similarly, partition 665 extends transversely at the front end of compartment 652. Partitions 666 and 667 are associated with compartments 654 and 656. Upstanding flange 664A is provided and associated with partition 654. Similar flanges 665A, 666A and 667A are provided with partitions 665, 666 and 667. As seen, each of the flanges are transversely offset and adapted in the dump position to engage one of the tabs 630, 631, 632 and 633 of the on-site container. Thus, when the container is engaged by lifting arm 670 of carriage 672 and elevated to the dump position generally inverted over the divider 660, the compartments 612, 613, 614 and 615 of the containers will generally align with separate chambers in the collection vehicle. As the on-site container is lowered, tabs 630 to 633 will each engage the associated projections 664A to 667A causing the doors to open. The contents of compartments 612 to 615 will be discharged into chambers 650, 652, 654 and 656 of the collection vehicle thereby inherently separating the trash components. At the completion of the dumping operation, the container can be returned to the home position for further reception of waste.

Once the collection vehicle 640 is full or the collection route completed, the collection vehicle will return to a central refuse depot. For efficiency of unloading, the collection trailer 640 is pivotally carried on a chassis 700 of truck 702. A hydrauliclly actuated cylinder 710 may be pressurized, tilting the entire trailer 640 as been in FIG. 21. A side gate 720 in side wall 641 is first unlatched and when the trailer is tilted will assume a generally vertical position as shown in FIG. 21 causing the contents of each of the compartments 650, 652, 654, 656 to be discharged.

For efficiency, the contents of the collection vehicle will fall into a subgrade adjacent trough 750 which is suitably partitioned corresponding to compartments 650 to 656. A conveyor 730 is associated with each of the chambers in the trough to deliver the respective trash components to a site for further processing.

The term "trailer" as used herein is used broadly to mean any enclosure which may be directly or indirectly coupled to a towing vehicle and includes solid body designs as often used in the waste hauling industry.

As seen from the foregoing, there are many substantial features incorporating the various embodiments of the invention as described above. The design is compact and efficient and serves to inherently segregate the trash into preselected components for recycling of the selected components resulting in reduced pressure on landfills. Further, the system is economically beneficial as it provides the operator with segregated refuse components which can be sold or re-used for substantial economic benefit. The system is convenient inasmuch as the relatively simple task for the waste depositor to segregate the material at the time of placement in the on-site container. The system may be easily adapted to retrofit to equipment now in use by waste collection companies and governmental subdivisions such as municipalities.

It will be obvious to those skilled in the art to make various changes, alterations and modifications to the refuse collection system described herein. To the extent such changes, alterations and modifications do not depart from the spirit and scope of the appended claims. They are intended to be encompassed herein.

I claim:

1. An improved method of collecting refuse comprising the steps of:

(a) providing a plurality of refuse containers to be emptied wherein each said refuse container is provided with a plurality of compartments, each compartment designated for the containment of a single type of refuse such as glass, aluminum, plastics and waste, at least selected compartments being provided with an openable and closable cover;
   (b) providing a mobile waste collection truck having a trailer with a plurality of refuse storage chambers each of which is designated to receivably store and transport one of said refuse types;
   (c) providing loader means associated with said vehicle having container pick-up means for retainably holding said container and lift means for elevating said container from a home, on-site location to a dump position in which the container is at least partially inverted over said trailer;
   (d) positioning said container in said dump position relative to said chamber to substantially cause the contents of each of the container compartments to be emptied into a separate of said chambers in said trailer thereby separating the waste into preselected components, said covers each assuming a position adjacent a separate chamber to assist in directing the contents of the container compartments to a selected separate chamber;
   (e) thereafter lowering said emptied refuse container to said home position; and
   (f) disengaging the loader means from said container.

2. The method of claim 1 further including providing indicia means on said container for the user to establish a particular type of refuse to be deposited and contained within the said particular compartment.

3. The method of claim 1 further including the steps of compacting the contents of said trailer chambers at predetermined intervals.

4. The method of claim 1 further including the step of driving the truck to a centralized collection depot at the completion of a collection route and thereafter emptying the contents of each said trailer chamber into a separate waste-receiving receptacle.

* * * * *